(12) United States Patent
Knittel et al.

(10) Patent No.: US 8,693,301 B2
(45) Date of Patent: Apr. 8, 2014

(54) HIGH DATA DENSITY OPTICAL RECORDING MEDIUM

(75) Inventors: Joachim Knittel, Villingen (DE); Stephan Knappmann, Rottweil (DE)

(73) Assignee: Thomson Licensing, Boulogne-Billancourt (FR)

( * ) Notice: Subject to any disclaimer, the term of this patent is extended or adjusted under 35 U.S.C. 154(b) by 369 days.

(21) Appl. No.: 12/657,381

(22) Filed: Jan. 19, 2010

(65) Prior Publication Data

US 2010/0188957 A1    Jul. 29, 2010

(30) Foreign Application Priority Data

Jan. 27, 2009   (EP) ..................................... 09305071

(51) Int. Cl.
*G11B 7/00* (2006.01)

(52) U.S. Cl.
USPC ........................................................ 369/126

(58) Field of Classification Search
USPC ................ 369/275.1, 275.2, 275.3, 126, 283, 369/112.08, 44.26, 13.33; 216/51; 430/321; 428/64.01
See application file for complete search history.

(56) References Cited

U.S. PATENT DOCUMENTS

| | | | |
|---|---|---|---|
| 5,979,772 A | 11/1999 | Takei et al. | |
| 6,094,413 A * | 7/2000 | Guerra | 369/275.1 |
| 6,507,552 B2 * | 1/2003 | Gibson | 369/126 |
| 6,687,209 B2 * | 2/2004 | Ota et al. | 369/112.08 |
| 6,706,465 B1 | 3/2004 | Sano | |
| 6,728,196 B2 | 4/2004 | Edwards | |
| 6,890,704 B2 * | 5/2005 | Edwards | 430/321 |
| 7,082,093 B1 * | 7/2006 | Magnitskii et al. | 369/94 |
| 7,406,005 B2 | 7/2008 | Hasegawa | |
| 7,406,027 B2 * | 7/2008 | Magnitskii et al. | 369/283 |
| 7,531,103 B2 * | 5/2009 | Okawa et al. | 216/51 |
| 7,796,353 B2 * | 9/2010 | Schabes et al. | 360/59 |
| 8,003,187 B2 * | 8/2011 | Milster et al. | 428/64.1 |
| 2003/0169671 A1 | 9/2003 | Saimi et al. | |

FOREIGN PATENT DOCUMENTS

| | | |
|---|---|---|
| CN | 1194711 | 9/1998 |
| CN | 1295711 | 5/2001 |
| CN | 1333537 | 1/2002 |
| CN | 1623197 | 6/2005 |
| EP | 1 486 962 A | 12/2004 |
| JP | 2002298432 | 10/2002 |
| JP | 2000 293888 A | 9/2003 |
| JP | 2004164740 | 6/2004 |
| JP | 2006048807 | 2/2006 |
| WO | WO9736293 | 10/1997 |
| WO | WO03073420 | 9/2003 |
| WO | WO2008047245 | 4/2008 |

OTHER PUBLICATIONS

Bouhelier A. et al.: "Near-field second-harmonic generation induced by local field enhancement" Physical Review Letters APS USA, vol. 90, No. 1, Jan. 10, 2003, pp. 013903/1-013903/4, XP002518700 ISSN: 0031-9007.

(Continued)

*Primary Examiner* — Nabil Hindi
(74) *Attorney, Agent, or Firm* — Tutunjian & Bitetto, P.C.

(57) ABSTRACT

A high data density optical recording medium, a method and an apparatus for reading such an optical recording medium, and a method for mastering such an optical recording medium are proposed. For achieving a high data density the optical recording medium has marks that have a tip and are covered by a material that generates a detectable effect under the influence of high electric fields.

11 Claims, 7 Drawing Sheets

(56) References Cited

OTHER PUBLICATIONS

Sanchez E. J. et al. "Near-field fluorescence microscopy based on two-photon excitation with metal tips" Physical Review Letters, American Physical Society, New York, US, vol. 82, No. 20, May 17, 1999, pp. 4014-4017, XP002479123 ISSN: 0031-9007.

Novotny L et al.: Near-Field Optical Imaging Using Metal Tips Illuminated by Higher-Order Hermite-Gaussian Beams' Ultramicroscopy, Amsterdam, NL, vol. 71, Jan. 1, 1998, pp. 21-29, XP002900995 ISSN: 0304-3991.

Stadler J et al.: "Tighter focusing with a parabolic mirror", Optics Letters, OSA, Optical Society of America, Washington, DC, US, vol. 33, No. 7, Apr. 1, 2008, pp. 681-683 XP001513007 ISSN: 0146-9592.

Lee, DB: "Anisotropic Etching of Silicon" Journal of Applied Physics Oct. 1969 vol. 40, No. 11, Oct. 1969 pp. 4569-4574, XP002518701.

Xu O et al.: "Fabrication of free-standing metallic pyramidal shells", NANO Letters Dec. 2004 American Chemical Society US, vol. 4, No. 12, Dec. 2004, pp. 2509-2511, XP002518702.

Search Report dated Mar. 11, 2009.

Henzie, Joel et al., "Manipulating the optical Properties of Pyramidal Nanoparticle Arrays", J. Phys. Chem B, vol. 110, No. 29, Jul. 1, 2006, pp. 14028-14031.

\* cited by examiner

HIGH DATA DENSITY OPTICAL RECORDING MEDIUM

This application claims the benefit, under 35 U.S.C. §119 of European Patent Application 09305071.4, filed Jan. 27, 2009.

FIELD OF THE INVENTION

The present invention relates to a high data density optical recording medium. The invention further relates to a method and an apparatus for reading from such an optical recording medium, and to a method for mastering such an optical recording medium.

BACKGROUND OF THE INVENTION

There is a general need for high data density optical recording media. One possibility to increase the data density is to use physical effects that allow to reach a resolution beyond the diffraction limit of the reading light. Recently it has been shown that the electric field intensity near a metallic tip can be strongly enhanced. See, for example, A. Bouhelier et al.: "*Near field second harmonic generation induced by local field enhancement*", Phys. Rev. Lett. 90, Num. 3 (2003) 013903-1. In E. J. Sánchez et al: "*Near-Field Fluorescence Microscopy Based on Two-Photon Excitation with Metal Tips*", Phys. Rev. Lett. 82, Num. 20 (1999), pp. 4014 an enhancement by a factor of 1000 to 3000 is reported. To efficiently excite these electric fields, preferably a radially polarized doughnut shaped beam is used. Such a doughnut shaped beam has a reduced spot size. For example, with NA=0.9 the spot size (diameter) generated by the longitudinal field is reduced by a factor of 1.22. See J. Stadler et al.: "*Tighter focusing with a parabolic mirror*", Opt. Lett. 33, Num. 7 (2008), pp. 681.

SUMMARY OF THE INVENTION

It is an object of the invention to propose a structure for an optical recording medium as well as a corresponding pickup that allows to make use of the above described effect for optical data storage.

According to the invention, an optical recording medium has marks, which have a tip and are covered by a material that generates a detectable effect under the influence of high electric fields. Examples of such a material are a fluorescent material, a material for second harmonic generation, or a material causing an intensity dependent change of polarization. The marks preferably have a pyramidal shape or a cone shape.

When the marks on the optical recording medium are illuminated with a focused, preferably doughnut shaped light beam, the marks will mainly amplify the longitudinal component of the electric field of the light beam and generate a strongly enhanced electric field at the tip. Advantageously, the marks are covered by a metallic material. This leads to an even more enhanced electric field at the tip. In addition, by covering the tips with a suitable material second harmonic light is generated, i.e. light at halve the original wavelength. The intensity of the second harmonic depends on the square of the electric field. Therefore, the effective spot size is reduced by a factor of 1.41 in case of a Gaussian shaped intensity distribution. When a doughnut shaped light beam is used for reading the spot size is reduced by an additional factor of 1.22. By combining the two factors a spot size reduction of 1.41×1.22=1.72 is reached. This leads to capacity increase by a factor of 3. This value only is a lower estimate. As there are also nonlinearities involved in the field enhancement, the capacity increase is still larger. As an alternative to a material for second harmonic generation the marks may likewise be covered with a fluorescent material, since fluorescence is also preferentially generated at locations with high electric fields. Also any other measure that generates a detectable effect under the influence of high electric fields as generated at the tips of the marks of the optical recording medium may be used, e.g. an intensity dependent change of polarization.

Preferably, longer marks, i.e. 2T, 3T, etc., consist sequences of adjacent or partially overlapping marks. This simplifies the production of a master for the optical recording medium, as will be explained later with reference to a mastering method for the optical recording medium. Alternatively, longer pits consist of an elongated base part on which several adjacent or overlapping pyramidal or cone shaped marks are arranged.

According to a further aspect of the invention, an apparatus for reading from an optical recording medium according to the invention has a light source for generating a reading light beam and a beam shaper for transforming the reading light beam into a doughnut shaped light beam. The apparatus needs only a relatively simple pickup, compared with pickups needed for other high-capacity storage approaches, such as near-field storage. At the same time the pickup is easily downward compatible to other formats such as BluRay or DVD.

Similarly, a method for reading from an optical recording medium according to the invention has the steps of:
generating a reading light beam,
transforming the reading light beam into a doughnut shaped light beam, preferably with a beam shaper,
illuminating a mark on the optical recording medium with the doughnut shaped light beam, and
detecting second harmonic light or fluorescent light generated at the optical recording medium.

The doughnut shaped light beam leads to a reduction of the spot size of the light beam on the optical recording medium, which in turn leads to a higher electric field at the tips of the marks. A further spot size reduction is achieved when a parabolic mirror is used for focusing the light beam.

Favorably, a dichroic or polarization beam splitter separates second harmonic light, fluorescent light, or light whose direction of polarization is rotated, which is generated at the optical recording medium, from reflected reading light. This allows to easily separate the light generated by the marks from the reflected reading light beam. In addition, the beam splitter allows to use the reflected reading light beam for focus and tracking control.

According to still a further aspect of the invention, the optical recording medium is a recordable medium having at least one recording area, the at least one recording area being provided with marks having a tip which are transformable into an inactivated state. In order to realize a write-once optical recording medium, the whole recording area is provided with marks having a tip. For recording data in the recording area, the marks are transformed into an inactive state. This is done, for example, by destroying the tips of the marks or at least the material deposited on the marks, for example with a high power write laser.

Apparently, by inactivating those marks that should not be present the inverse mark sequence is written to the recording area. Therefore, an apparatus for writing to an optical recording medium according to the invention has a light source for generating a writing light beam and a processor for generating an inverse data pattern to be written to the optical recording medium.

Accordingly, a method for writing to an optical recording medium according to the invention has the steps of:
generating an inverse data pattern to be written to the optical recording medium,
generating a writing light beam in accordance with said inverse data pattern, and
transforming marks on the optical recording medium into in inactive state with said writing light beam.

A method for mastering an optical recording medium according to the invention has the steps of:
providing a wafer with a protective layer,
forming a mask of the protective layer,
unisotropically etching the wafer through the mask so that inverted marks each having a tip are formed, and
removing the mask.

Preferably, the wafer is a Si-waver and the protective layer a $SiO_2$ layer. Though the mastering is more difficult than known mastering methods used for other types of optical recording media, once the master is produced the optical recording medium according to the invention is suitable for mass production. The term etching here denotes a plurality of processes, including wet etching, plasma etching, electron beam etching or other processes that allow to remove material from the wafer.

Advantageously, the step of forming a mask of the protective layer includes mastering holes or sequences of holes at the positions of the inverted marks, the size of the holes being smaller than the intended size of the inverted marks. This allows to easily generate sequences of marks as advantageously used for the production of longer marks.

Similarly, an apparatus for mastering an optical recording medium according to the invention has:
means for providing a wafer with a protective layer,
means for forming a mask of the protective layer,
means for unisotropically etching the wafer through the mask so that inverted marks each having a tip are formed, and
means for removing the mask.

BRIEF DESCRIPTION OF THE FIGURES

For a better understanding the invention shall now be explained in more detail in the following description with reference to the figures. It is understood that the invention is not limited to this exemplary embodiment and that specified features can also expediently be combined and/or modified without departing from the scope of the present invention as defined in the appended claims. In the figures:

DETAILED DESCRIPTION OF PREFERRED EMBODIMENTS

Figure 1:
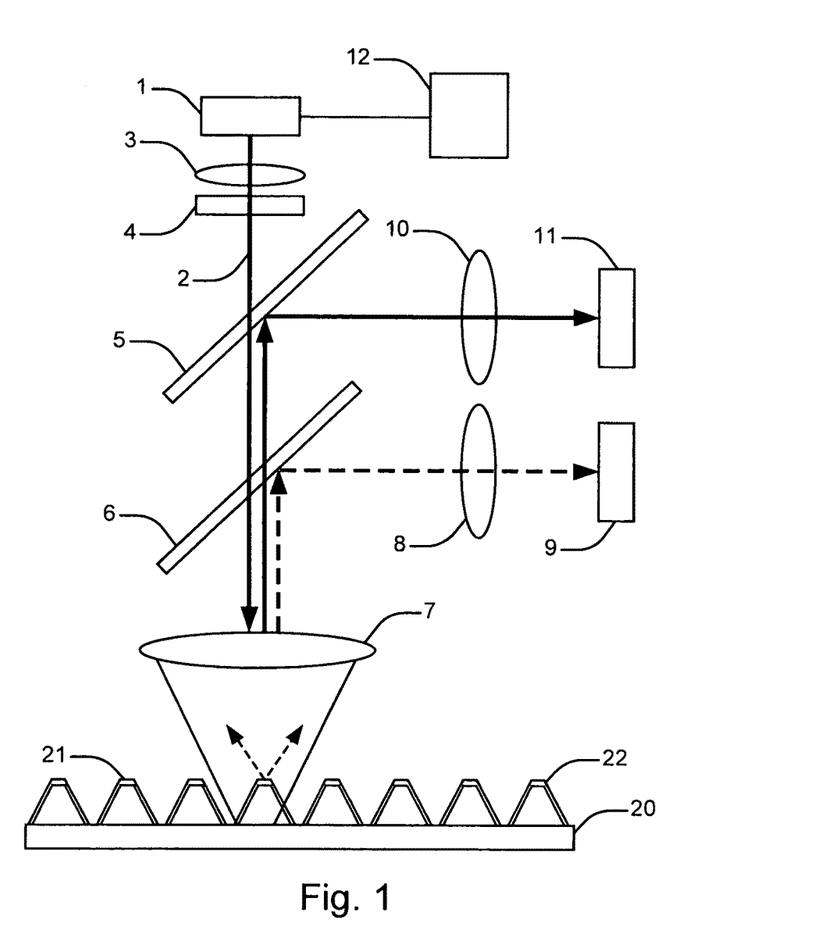
FIG. 1 an apparatus for reading from an optical recording medium according to the invention.

An apparatus for reading from and/or writing to an optical recording medium according to the invention is shown in FIG. 1. The light 2 of a laser diode 1 is collimated by a lens 3 and optionally transformed into a doughnut beam by a beam shaper 4. The beam shaper 4 is advantageously used if the apparatus is only used for optical recording media according to the invention. In case the apparatus is also used for conventional optical recording media such as CD, DVD, or Blu-Ray Disk, the beam shaper 4 is preferably omitted. The collimated light beam then passes a first beam splitter 5 and a beam splitter 6 and is focused onto the optical recording medium 20 by a first objective lens 7. The optical recording medium 20 has marks 21 that are covered with a material layer 22 and each have a tip. The material layer 22 consists of a material that generates a detectable effect under the influence of high electric fields. Examples of such a material are a fluorescent material, a material for second harmonic generation, or a material causing an intensity dependent change of polarization. Located below the material layer 22 preferably is a metal layer (not shown), which leads to an even more enhanced electric field at the tip. The focused beam induces a high electric field at the tip of the marks 21 and second harmonic light, fluorescent light or light whose direction of polarization is rotated is generated (illustrated by the dashed lines). This light is collected by the first objective lens 7, separated from the main beam by the beam splitter 6 and focused onto a first detector 9 by a second objective lens 8 to yield the data signal. Depending on whether light with a different wavelength or light with a different direction of polarization is generated by the marks, the beam splitter 6 is a dichroic beam splitter or a polarization beam splitter. The first objective lens 7 does not need to be optimized for the second harmonic or the fluorescence wavelength, as it is only needed to collect the radiation. The shape of the light spot on the first detector 9 is not critical for detecting the presence of a mark 21. The original light is transmitted through the beam splitter 6 and deviated by the first beam splitter 4 towards a second detector 11, onto which it is focused by a third objective lens 10. The signal obtained by the second detector is advantageously used to generate control signals for focus and tracking in a conventional way. For this purpose it is advantageous if the first objective lens 7 is optimized for the reading wavelength emitted by the laser diode 1. For writing the apparatus has a processor 12 for modulating a writing light beam in such way that an inverted data pattern is written.

Figure 2:
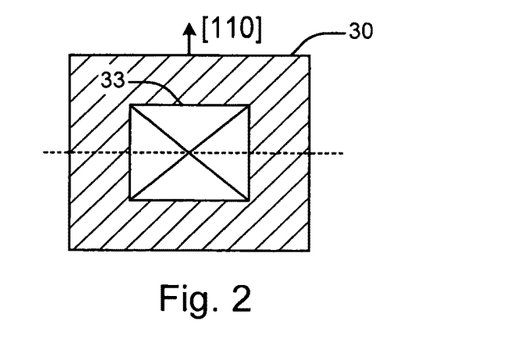
FIG. 2 shows a top view of a pyramidal mark generated in Si by anisotropic etching.
Figure 3:
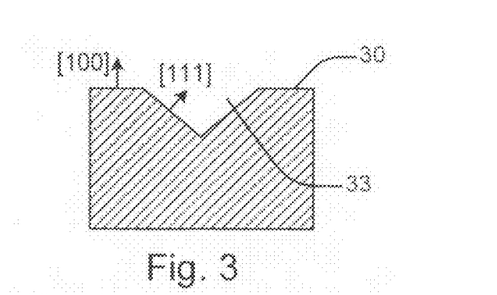
FIG. 3 shows a side view of the pyramidal mark of FIG. 2.

It has been demonstrated that inverted pyramidal marks can be generated in Si having a certain crystalline surface (called Si(100)) by anisotropic etching. See, for example, D. B. Lee: "*Anisotropic Etching of Silicon*", J. Appl, Phys. 40 (1969), pp. 4569. Heated KOH (potassium hydroxide) solvents can etch silicon very selectively to the crystal orientation. As the (111) planes are etched very slowly, inverted pyramids are formed. A top view of an inverted pyramidal mark 33 generated in a Si-wafer 30 by anisotropic etching is shown in FIG. 2. Also illustrated is the [110]-direction of the Si-wafer 30. The corresponding side view along the dotted line of FIG. 2 is depicted in FIG. 3. Also shown are the [100]-direction and the [111]-direction.

Figure 4:
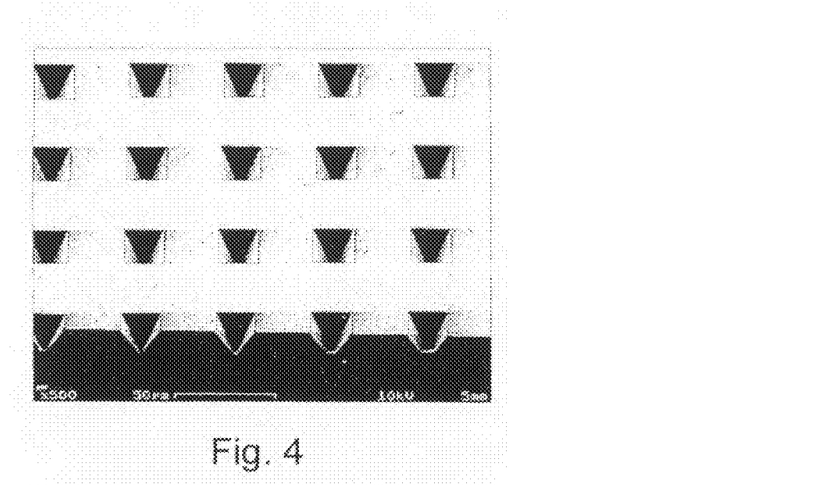
FIG. 4 depicts a first microscope image of inverse pyramidal structures on a Si-wafer.
Figure 5:
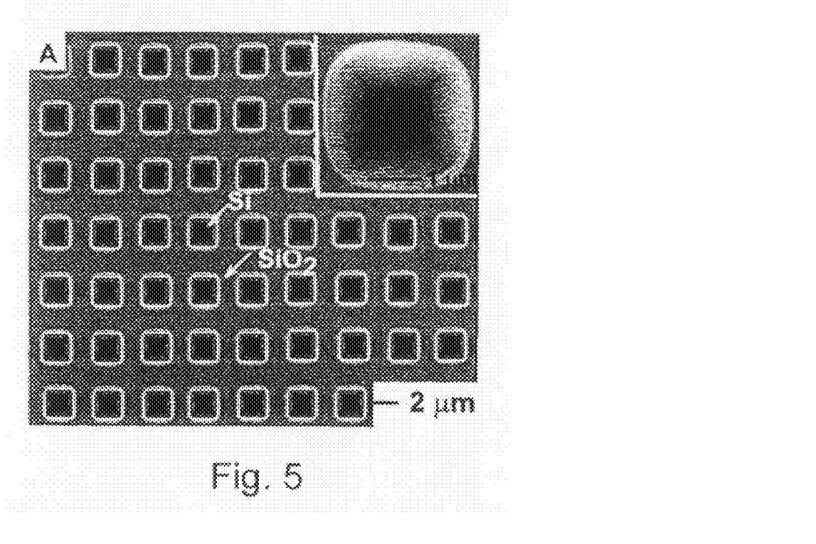
FIG. 5 depicts a second microscope image of inverse pyramidal structures on a Si-wafer.

FIGS. 4 and 5 show microscope images of inverse pyramidal structures on a Si-wafer. Illustrated are pyramids with a size of about 20 μm and 2 μm, respectively. However, the size of these pyramids can be made quite small, i.e. below 100 nm. The size mainly depends on the size of the hole in the SiO$_2$ mask and the etching time. FIG. 4 is reproduced from H. Presting et al.: "Nanoporous silicon for fuel cell systems", Austrian/German/French Seminar "Nanomaterials", 21-22 Oct. 2004. FIG. 5 is reproduced from Q. Xu et al.: "Fabrication of Free-Standing Metallic Pyramidal Shells", Nano Lett. 4 (2004), pp. 2509.

In the following an exemplary mastering process for an optical recording medium 20 according to the invention is explained with reference to FIGS. 6 to 15. This example is based on a Si-wafer. Of course, other materials that are suitable for anisotropic etching can likewise be used.

Figure 6:
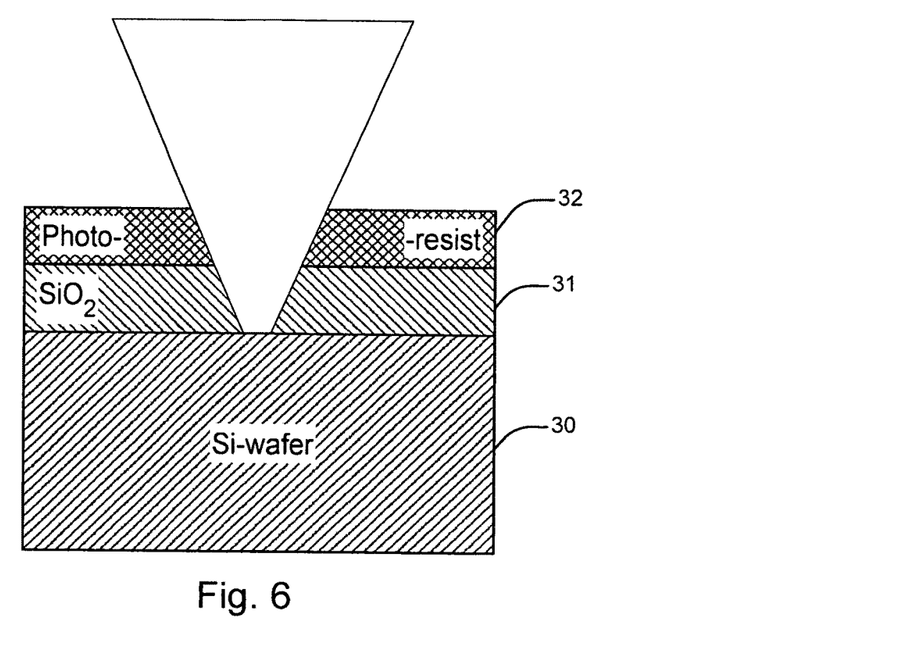
FIGS. 6-14 illustrate a mastering process for an optical recording medium according to the invention.
Figure 7:
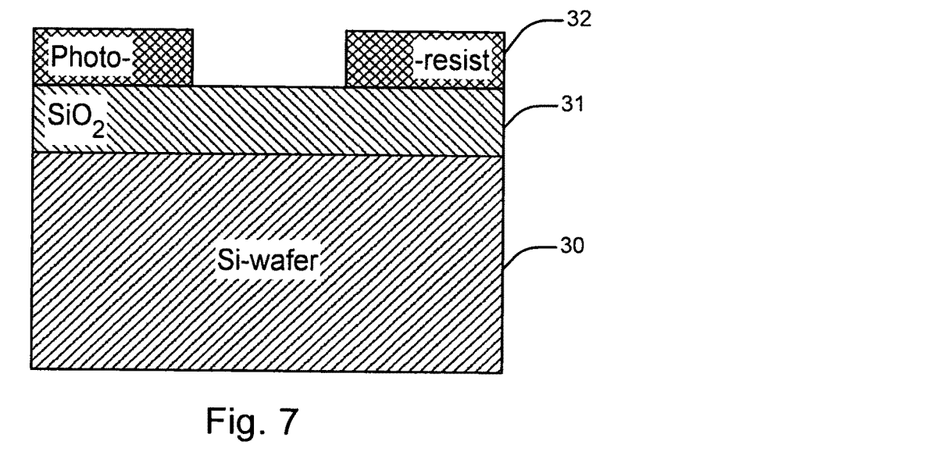
Figure 8:
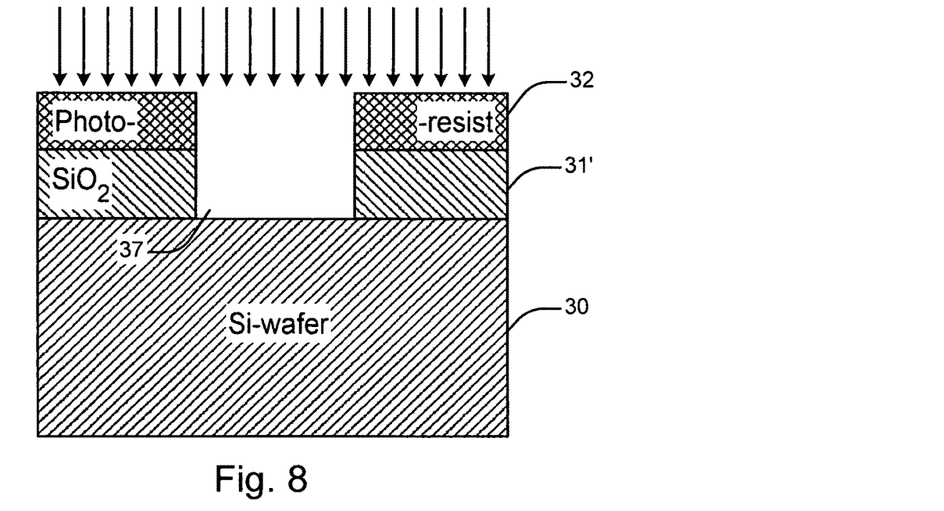
Figure 9:
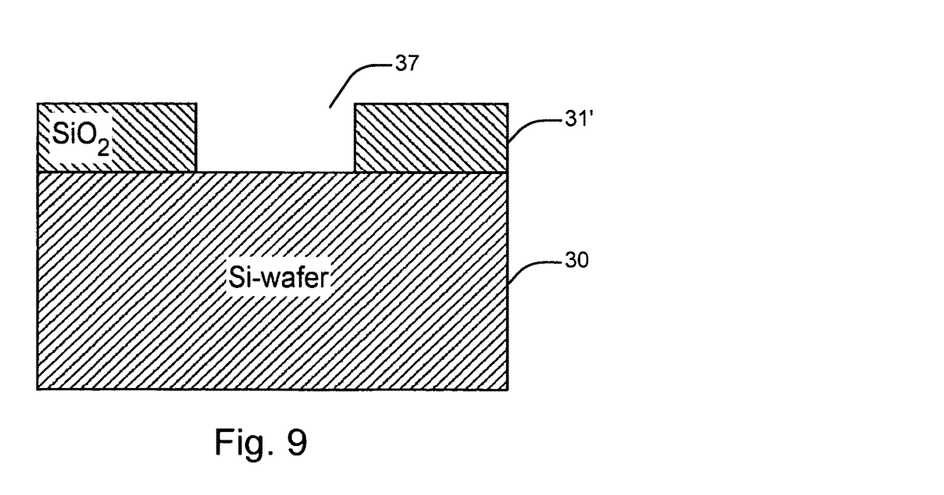
Figure 10:
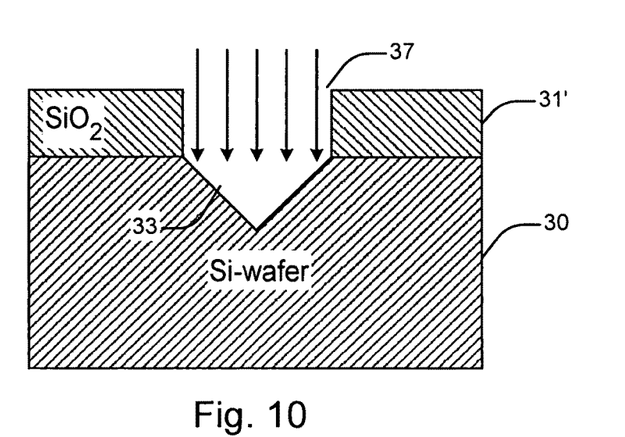
Figure 11:
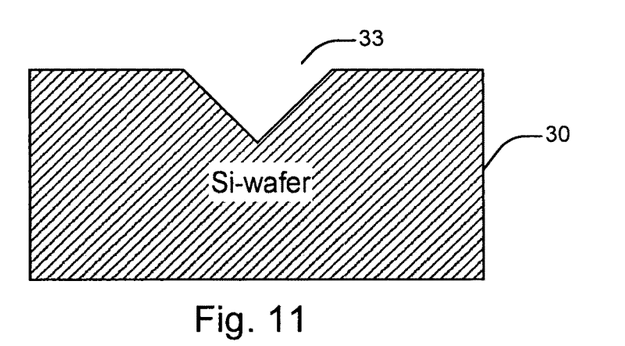
Figure 12:
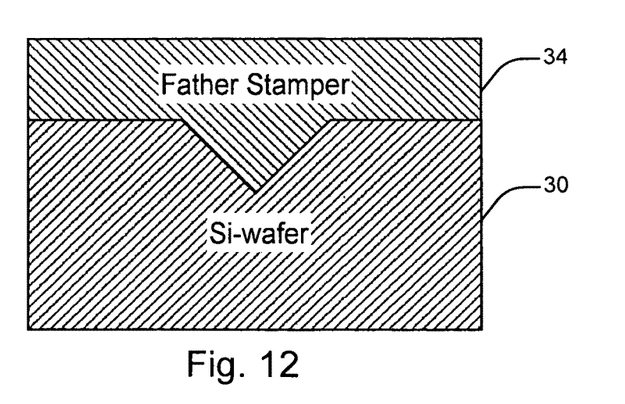
Figure 13:
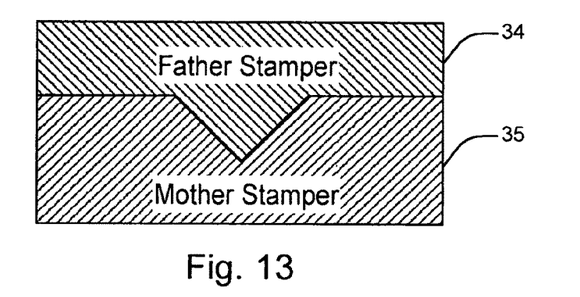
Figure 14:
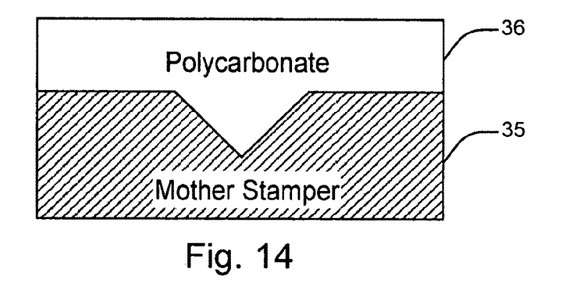

Firstly the overall mastering method from the Si-wafer 30 to the molded pyramidal marks is described with reference to FIGS. 6 to 14. By laser beam or e-beam recording, as shown in FIG. 6, a photoresist material layer 32 is illuminated. Afterwards the photoresist material layer 32 is developed, as can be seen in FIG. 7. An etching process is performed after development, which removes an SiO$_2$ layer 31 arranged on the Si-wafer 30. This step is depicted in FIG. 8. In this way a SiO$_2$ mask 31' is obtained, which has holes 37 at the positions of the marks to be produced. As illustrated in FIG. 9, the remaining photoresist 32 is removed. In the next step, which is depicted in FIG. 10, the Si-wafer 30 is etched through the SiO$_2$ mask 31' so that the inverted pyramids 33 are formed. FIG. 11 shows how the SiO$_2$ mask 31' is subsequently removed. In a sputtering process the father stamper 34 is produced, as shown in FIG. 10. An electroplating processes is the used for producing the mother stamper 34. This is illustrated in FIG. 13. Finally, as can be seen in FIG. 14, substrates 35 are molded, using for example polycarbonate.

Figure 15:
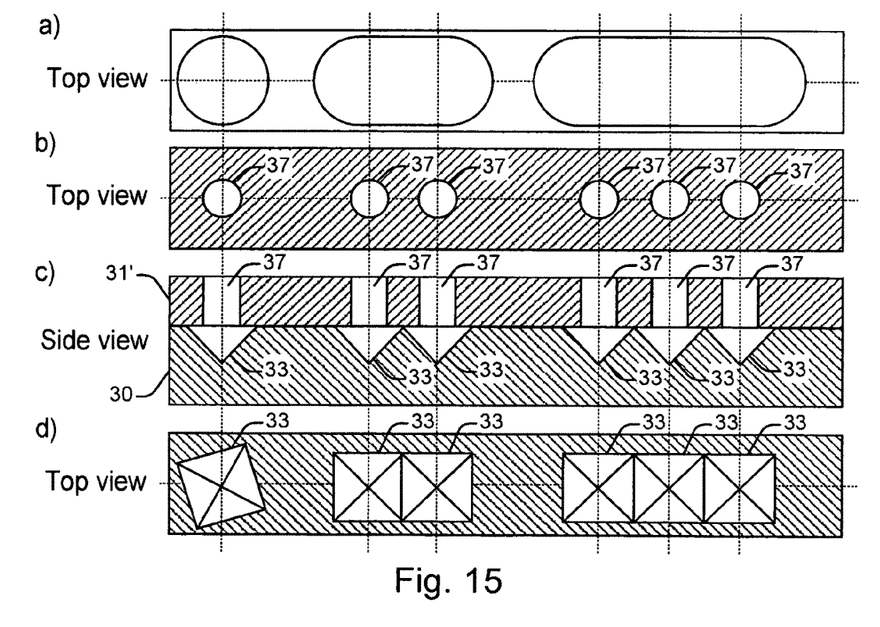
FIG. 15 shows a process for mastering longer marks,
FIG. 16 schematically depicts an optical recording medium according to the invention.

Secondly the process of mastering longer marks (2T, 3T, etc.) shall be described with reference to FIG. 15. This is not a trivial task because the known standard mastering processes for longer marks do not work in this case. In particular the mastering of longer marks 38 as shown in FIG. 15a) would only result in large pyramidal marks. The basic idea for the mastering process is thus to place several inverted pyramidal shaped marks 33 very close together to obtain a sequence of small inverted marks 33. For this purpose the central positions of the inverted pyramidal marks 33 are first mastered as shown in FIG. 15 b). The size of these mastered holes 37 is chosen small enough to avoid excessive overlapping of the inverted pyramidal marks 33. Then, for each small mastered hole 37 in the SiO$_2$ mask 31' a separate inverted pyramid 33 is etched as depicted in FIG. 15c). The etching process is kept ongoing and the inverted pyramids 33 are partially etched below the SiO$_2$ mask 31'. The etching process is stopped at the right time in order to keep individual, separated inverted pyramid tips. This is illustrated in FIG. 15d).

As the edges of the inverted pyramidal marks 33 are always oriented parallel to the crystalline (110) direction, along the track the inverted pyramids 33 are continuously rotated with respect to the tangential direction. One example for this rotation is shown for the single inverted mark 33 on the left side of FIG. 15. However, this does not influence the functionality of the electrical field enhancement described above.

Although the mastering process itself is more complex than a standard mastering process, the replication of the optical recording medium is quite simple. It is sufficient to adapt the molding process parameters to replicate the pyramidal marks 33 is from the mother stamper 35.

Figure 16:
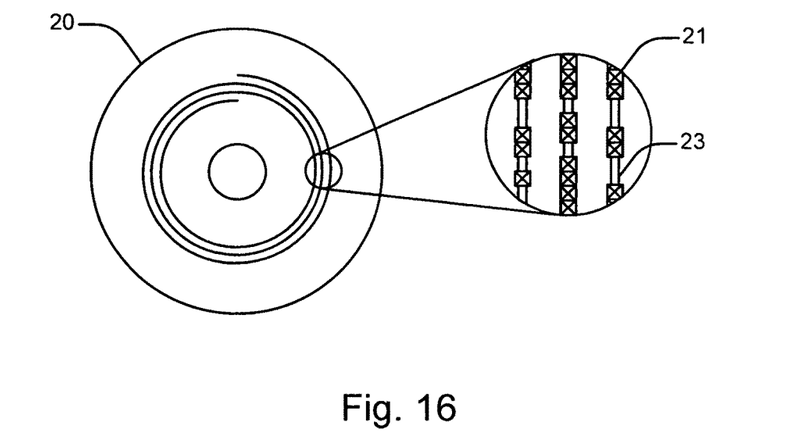

An example of an optical recording medium 20 according to the invention is illustrated schematically in FIG. 16. Part a) of the figure shows the whole optical recording medium 20, part b) shows an exaggerated zoom of a track 23 including a plurality of marks 21. In this example the optical recording medium 20 is a disk-shaped medium, where the marks 21 are arranged in one or more spiral or concentric circular tracks 23. Of course, the optical recording medium 20 may likewise have a different shape, e.g. a card shape. Also, the marks are not necessarily arranged in tracks.

Figure 17:
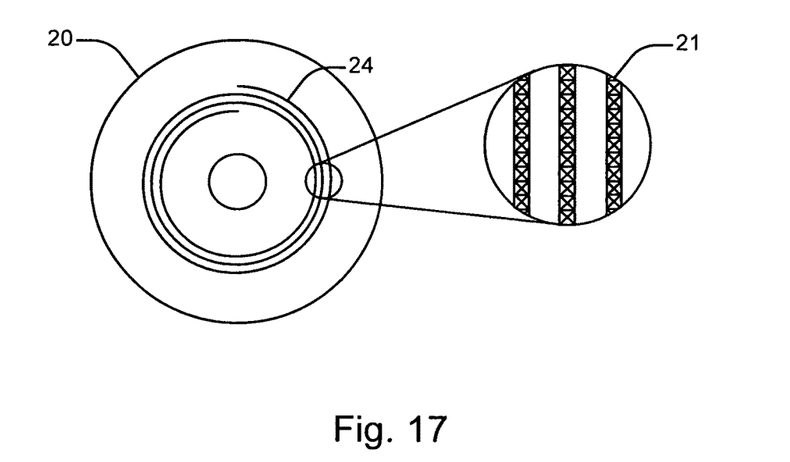
FIG. 17 illustrates an optical recording medium according to the invention having a recordable area.

FIG. 17 depicts a further example of an optical recording medium 20 according to the invention. The optical recording medium 20 is similar to the medium of FIG. 16. However, in this case a recordable area 24 is provided. As can be seen from part b) of the figure, the tracks 23 in the recordable area 24 are fully filled with marks 21. For recording data some marks 21 are transformed into an inactive state, e.g. by laser irradiation. In their inactive state these marks 21 do no longer cause a field enhancement. For this purpose it is sufficient if the tips of the marks 21 are destroyed or if the layer that which generates a detectable effect under the influence of high electric fields is removed, destroyed or inactivated.

What is claimed is:

1. A disk-shaped rotatable optical recording medium, comprising:
marks arranged along tracks, wherein the marks protrude above a surface of the optical recording medium and have a tip or a sequence of tips and are covered by a material that generates a detectable effect under the influence of high electric fields generated in a focus of a reading light beam illuminated onto the optical recording medium in a direction perpendicular to the surface of the optical recording medium.

2. The optical recording medium according to claim 1, wherein the material covering the marks is a fluorescent material, a material for second harmonic generation, or a material causing a change of polarization.

3. The optical recording medium according to claim 1, wherein the marks have a pyramidal shape or a cone shape.

4. The optical recording medium according to claim 1, wherein the marks are transformable into an inactive state in which the material covering the tips does not generate a detectable effect under the influence of high electric fields generated in a focus of a reading light beam.

5. The optical recording medium according to claim 1, wherein longer marks consist of sequences of adjacent or partially overlapping marks, or have an elongated base part on which two or more adjacent or overlapping marks are arranged.

6. The optical recording medium according to claim 1, wherein the marks are further covered by a metallic material.

7. An apparatus for writing to an optical recording medium comprising marks, which protrude above a surface of the optical recording medium, the marks having a tip or a sequence of tips and are covered by a material that generates a detectable effect under the influence of high electric fields generated in a focus of a reading light beam, wherein the apparatus comprises:
a light source for generating a writing light beam,
an objective lens for illuminating the writing light beam onto marks to be transformed into an inactive state, and
a processor for generating an inverse data pattern to be written to the optical recording medium.

8. A method for writing to an optical recording medium comprising marks, which protrude above a surface of the optical recording medium, the marks having a tip or a sequence of tips and are covered by a material that generates a detectable effect under the influence of high electric fields generated in a focus of a reading light beam, wherein the method comprises the steps of:

generating an inverse data pattern to be written to the optical recording medium, generating a writing light beam in accordance with said inverse data pattern, and transforming marks on the optical recording medium into an inactive state, in which the material covering the tips does not generate a detectable effect under the influence of high electric fields generated in a focus of a reading light beam, by illuminating said writing light beam onto marks to be transformed into an inactive state.

9. A method of making disk-shaped rotatable optical recording medium comprising marks arranged along tracks, wherein the marks protrude above a surface of the optical recording medium and have a tip or a sequence of tips and are covered by a material that generates a detectable effect under the influence of high electric fields generated in a focus of a reading light beam illuminated onto the optical recording medium in a direction perpendicular to the surface of the optical recording medium, the method comprising the steps of:

providing a crystalline wafer with a protective layer, forming a mask of the protective layer by mastering holes or sequences of holes at positions of inverted marks, a size of the holes being smaller than an intended size of the inverted marks, unisotropically etching the wafer through the mask so that the inverted marks are formed, each inverted mark having a tip, and removing the mask.

10. The method according to claim 9, wherein the wafer is a Si-wafer and the protective layer is an $SiO_2$ layer.

11. An apparatus for making a disk-shaped rotatable optical recording medium comprising marks arranged along tracks, wherein the marks protrude above a surface of the optical recording medium and have a tip or a sequence of tips and are covered by a material that generates a detectable effect under the influence of high electric fields generated in a focus of a reading light beam illuminated onto the optical recording medium in a direction perpendicular to the surface of the optical recording medium, the apparatus comprising:

means for providing a wafer with a protective layer, means for forming a mask of the protective layer by mastering holes or sequences of holes at positions of the inverted marks, a size of the holes being smaller than an intended size of the inverted marks, means for unisotropically etching the wafer through the mask so that the inverted marks are formed, each inverted mark having a tip, and means for removing the mask.

* * * * *